June 6, 1939.  L. G. SIMJIAN  2,161,264
POSE REFLECTING SYSTEM
Filed Nov. 24, 1936   2 Sheets-Sheet 1
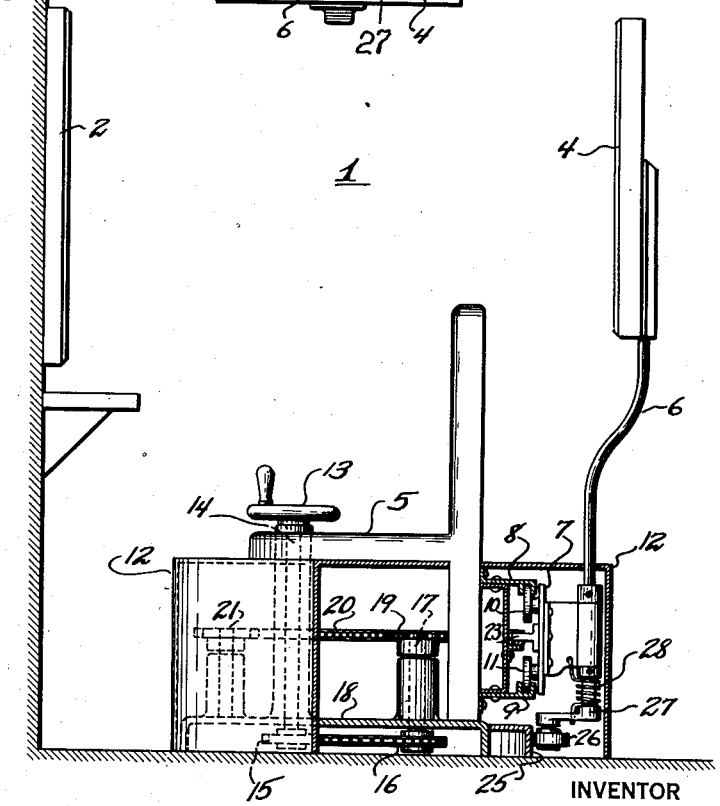
INVENTOR
Luther G. Simjian,
BY
Herbert H. Thompson
ATTORNEY.

June 6, 1939.   L. G. SIMJIAN   2,161,264
POSE REFLECTING SYSTEM
Filed Nov. 24, 1936   2 Sheets-Sheet 2
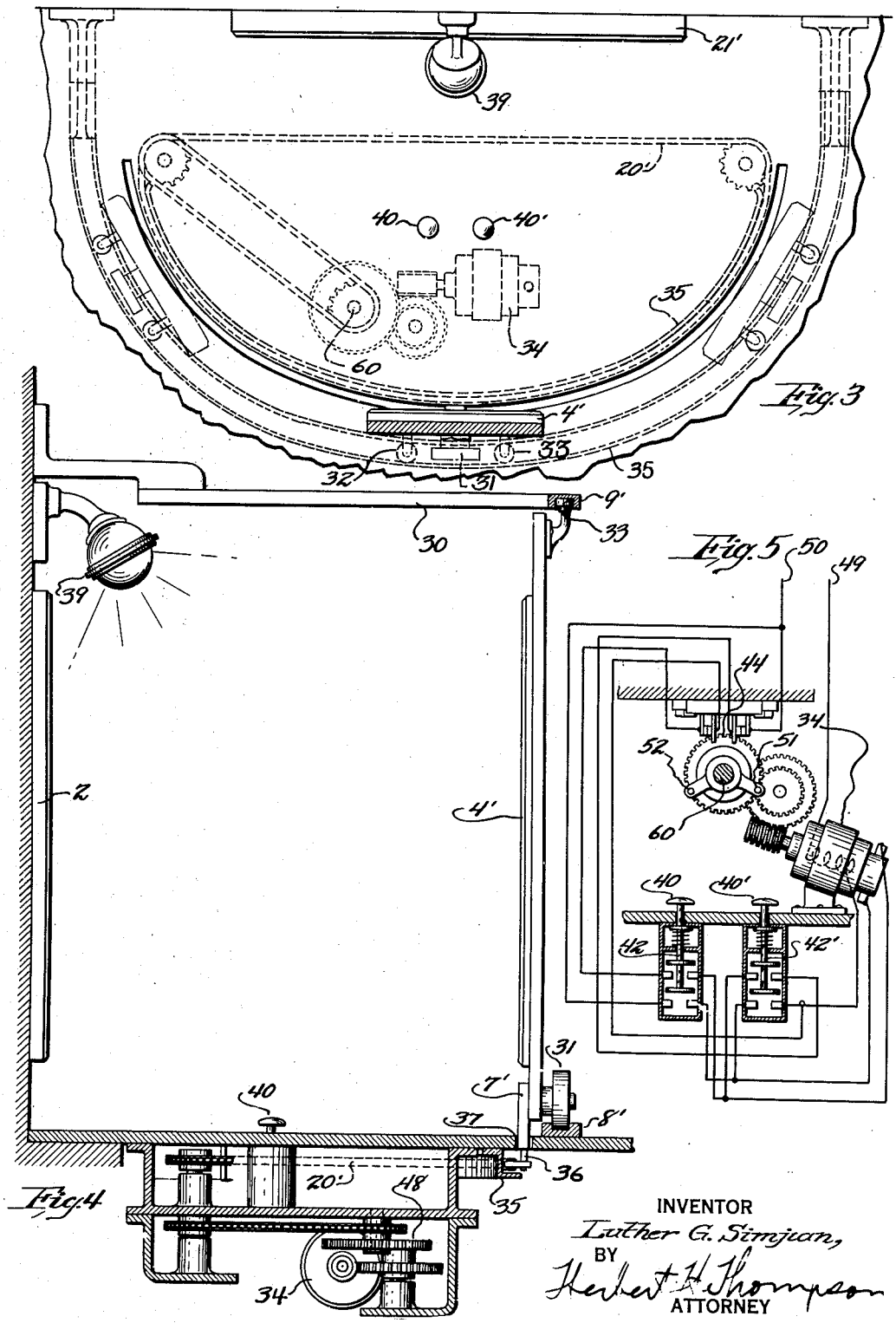
INVENTOR
Luther G. Simjian,
BY
Herbert H. Thompson
ATTORNEY Patented June 6, 1939

2,161,264

UNITED STATES PATENT OFFICE 2,161,264

POSE REFLECTING SYSTEM

Luther G. Simjian, New Haven, Conn., assignor to Reflectone Corporation, New Haven, Conn., a corporation of Delaware Application November 24, 1936, Serial No. 112,447

3 Claims. (Cl. 88—74)

This invention relates, generally, to mirror reflecting means, and the invention has reference, more particularly, to a novel pose reflecting system of such construction and arrangement that an observer may conveniently view images of his or her posture or figure from any angle desired, whereby the said system is especially suitable for use in beauty parlors, dress shops, barber shops, etc., and by haberdashers.

The ordinary fixed mirrors commonly used in business establishments of the above character merely enable the viewing of one's figure from a very limited number of angles unless one is willing to turn his head through various angles and hence assume all manner of postures necessitating undue physical exertion and resulting fatigue and annoyance.

The principal object of the present invention is to provide a novel pose reflecting system that is so constructed and arranged that the observer by merely looking substantially straight ahead is enabled to view his figure, or a portion thereof, from any angle desired.

Another object of the present invention lies in the provision of a novel pose reflecting system of the above character wherein a fixed mirror is provided in front of the observer, while a movable mirror operable through a special trackway and cable system is adapted to be moved to suitable positions to the rear or at the sides of the observer, whereby the latter is enabled, by looking ahead into the fixed mirror, to view his or her figure or desired portions thereof from any angle.

Still another object of the present invention is to provide a novel pose reflecting system of the above character wherein said movable mirror may be operated, either automatically through motor driven means or manually, the trackway system being so constructed and arranged as to position the movable mirror in any one of an unlimited number of positions, such that the position of this mirror with respect to the observer is so coordinated with its angular position with respect to the fixed mirror that the observer will always see the image of his figure substantially in front of him, regardless of the angle of view.

A further object of the present invention lies in the provision of a novel pose reflecting system of the above character that is of simple, reliable and rugged construction as well as attractive in appearance.

Other objects and advantages will become apparent from the specification, taken in connection with the accompanying drawings wherein the invention is embodied in concrete form.

In the drawings, showing two forms my invention may assume:

Fig. 1 is a plan view of one form of my invention.

Fig. 2 is a side elevation of the same.

Fig. 3 is a plan view of a modified form of my invention, especially adapted for full length mirrors.

Fig. 4 is a side elevation of the same.

Fig. 5 is a wiring diagram of this form of the invention.

Similar characters of reference are used in all of the above figures to indicate corresponding parts.

Referring now to Figs. 1 and 2, the reference numeral 1 designates the novel pose reflecting system as a whole, the same comprising a primary or fixed mirror 2 adapted to be mounted as on a wall 3, and a secondary or movable mirror 4 positioned some distance away and facing toward the mirror 2. Intermediate the mirrors 2 and 4 is positioned a chair 5 for receiving the poser or observer, which chair faces the fixed mirror so that the poser, in sitting in the chair, looks directly into mirror 2 and is enabled to view a virtual image of his or her head and upper body portion reflected from movable mirror 4.

The mirror 4 is adapted to be moved bodily around the back and sides of the chair 5 by use of a novel trackway and cable or chain arrangement that also serves to properly vary the angular position of the mirror 4 with respect to stationary mirror 2 during such movement, whereby light rays from the observer's body, doubly reflected from mirrors 4 and 2, will be directed to the eyes of the observer along lines that project substantially normally, i. e., at right angles to the plane of mirror 2, whereby the observer is not required to turn his or her head through more than a small angle in observing the head and upper body portion from any angle.

Movable mirror 4 is shown as mounted on a standard or rod 6 rotatably mounted in a carriage 7 which rolls around curved upper and lower trackways 8 and 9 by means of upper and lower pairs of rollers 10 and 11 which are guided by double flanges on the trackway. Said trackway may partially encircle the chair 5 and may be enclosed in a housing 12.

For revolving the carriage around the trackway, I have shown a hand wheel 13 mounted on a vertical shaft 14 journaled beside the chair and having a sprocket or pulley 15 secured adjacent its lower end, which drives a similar sprocket or pulley 16 on a vertical shaft 17 journaled on fixed plate 18. On the upper end of shaft 17 I show another sprocket wheel 19 with which a flexible sprocket chain 20 meshes, said chain extending around sprocket wheels 21 and 22 adjacent the ends of the trackway and passing into the trackway block and between the tracks proper, being secured at each end to a pin or pins 23 on carriage 7 to form an endless belt device. Hence I provide a positive coupling between hand wheel 13 and carriage 7 to move the latter in either direction desired by turning the hand wheel.

As explained in my previous application for Letters Patent Serial No. 105,451, filed October 14, 1936, for Pose reflecting systems, it is necessary to keep mirror 4 positioned at the proper angle to fixed mirror 2 as it is revolved with carriage 7, so that the poser may see his back and profile views without moving his head. To this end, I provide an auxiliary trackway or cam surface 25 on which rolls a roller 26 on an arm 27 secured to or forming a part of shaft 6. As will be apparent from Fig. 1, the curvature of the cam will determine the angular position of the mirror 4, since shaft 6 is journaled in carriage 7. As shown, the cam should have a sharper curvature than the trackway on the side of chair 5 that the arm projects toward, and a lesser curvature on the opposite side, so that the mirror is turned about a center not coincident with the virtual image of the subject in mirror 2. A biasing spring 28 may be provided on carriage 7 to hold roller 26 against the cam 25, normally tending to rotate the mirror in a counter-clockwise direction in Fig. 1 about the axis of shaft 6.

Instead of having a separate trackway or cam to turn the mirror to the proper angle as it is revolved, I may so shape the main trackway as to accomplish this purpose, as shown in Figs. 3 and 4. In these figures the mirror 4' is shown as full length and traveling carriage 7', which carries the same, is supported and guided at bottom and top by trackways 8' and 9' mounted on the floor and a top bracket 30, respectively. A single heavy roller 31 is shown as supporting the weight of the mirror at the bottom, while at the top a pair of spaced guide rollers 32 and 33 may be provided. The trackway at the double roller end, at least, is so curved that the carriage is automatically turned through the proper angles as the carriage moves around the track (see Fig. 3). Such movement may be secured through a sprocket chain arrangement 20', as before. In this case, however, I have shown a motor 34 for revolving the chain and carriage, which may be mounted under the floor, as shown, with the chain 20' guided around a curved guideway 35 and secured to a pin 36 extending downwardly from carriage 7' through a curved slot 37 in the floor. A lamp 39 is shown for illuminating the poser. Motor 34 may be actuated at will, as from push buttons 40 and 40' in the floor convenient to the poser. Motor 34 is shown as a D. C. motor supplied from leads 49 and 50 and controlled by push buttons 40 and 40' fixed to the stems of reversing switches 42 and 42'.

When the observer depresses button 40', the switch 42' is closed, thereby energizing motor 34 to effect movement of mirror 4 to the right. The user or observer may stop the movement of mirror 4 at any position of its travel by merely removing his foot from the button 40', thereby allowing switch 42' to open under the action of the opening spring and breaking the circuit for motor 34. The motion of the mirror 4 stops almost immediately owing to the presence of reduction gearing 48.

When viewing one's profile, the user is apt to retain the button 40' depressed after mirror 4' has reached the right hand limit of its travel but for the action of limit switch 44, that serves to open the circuit of motor 34 just as the mirror reaches the limit of its travel. Thus, just as the mirror 4 reaches its limit of right hand travel, the pin 51 carried by bracket 52 fixed on shaft 60 opens limit switch 44, thereby opening the circuit for motor 34 to stop the same.

The power operation of motor 34 to effect left hand movement of mirror 4' is similar to the above and is produced by depressing button 40, thereby completing a circuit for motor 34 to cause the same to operate in the reverse direction.

From the foregoing description, many advantages of my invention over the prior mirror arrangements will be apparent. The facility with which a poser may see the front, rear and both sides of the head very quickly and with a minimum of effort, greatly increases the utility of a double mirror system of this character. In my invention, the poser may quickly obtain all the views of his head as seen by others, so that the full effect of a new hat or a new coiffure can be obtained at a glance by the poser. This has a great advantage in making sales, since most sales are made entirely by first impressions.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. A pose reflecting device for use in conjunction with an observing-mirror and comprising: a combined track-way and seat-structure having a seating-surface and a curved track-way extending partway there around and organized as a unit therewith; a carriage movable along the said curved track-way; a movable-mirror carried by the said carriage and movable therewith in a curved path around the seating-surface of the said seat-structure and changing its angular relationship with respect to the said seating-surface of the said seat-structure as the said movable-mirror moves along the said curved track-way with the said carriage; the seating-surface of the said seat-structure being located between the said movable-mirror and the observing-mirror, whereby the said movable-mirror changes its angular disposition with respect to the said seating-surface as it is moved along the said track-way with the said carriage, to enable the image of a rear-portion of a poser thereon to be reflected back to the poser.

2. A pose reflecting mirror-chair unit for use in conjunction with an observing-mirror and comprising: a seat; a substantially-horizontal guide-way secured to the said seat and encircling the back thereof; a carriage movable along the said guide-way; a movable-mirror carried by the said carriage and movable therewith along the said guide-way; the said carriage, the said guide-way and the said movable-mirror being so constructed and arranged that the said mirror is turned about a vertical axis while being moved around the back of the poser so that the poser may see, by double reflection, his back and profile views without substantially changing his position.

3. A mirror-chair unit as set forth in the preceding claim in which the said seat has a rotatable handle adjacent thereto for moving the said carriage on the said track-way; and connecting-means operatively interconnecting the said rotatable handle with the said carriage.

LUTHER G. SIMJIAN.